United States Patent [19]

Resconi et al.

[11] Patent Number: 5,596,052
[45] Date of Patent: Jan. 21, 1997

[54] ATACTIC POLYPROPYLENE

[75] Inventors: Luigi Resconi, Ferrara; Enrico Albizzati, Arona, both of Italy

[73] Assignee: Montell Technology Company bv, Netherlands

[21] Appl. No.: 622,566

[22] Filed: Mar. 25, 1996

Related U.S. Application Data

[62] Division of Ser. No. 456,291, May 31, 1995, abandoned, which is a continuation of Ser. No. 175,134, Dec. 29, 1993, abandoned.

[30] Foreign Application Priority Data

Dec. 30, 1992 [IT] Italy ................... MI92A2989

[51] Int. Cl.$^6$ ................................. C08F 4/64
[52] U.S. Cl. .................... 526/127; 526/132; 526/151; 526/153; 526/160; 526/351; 526/943; 502/155
[58] Field of Search .................... 526/127, 132, 526/151, 153, 160, 351, 943

[56] References Cited

U.S. PATENT DOCUMENTS 5,369,196  11/1994  Matsumoto et al. .................... 526/127

OTHER PUBLICATIONS

Seymour et al. "Advances In Polyolefins", pp. 361–371. Sep. 1985.

*Primary Examiner*—David W. Wu
*Attorney, Agent, or Firm*—Bryan Cave LLP

[57] ABSTRACT

Amorphous propylene polymers are disclosed having the following characteristics:

(a) intrinsic viscosity $[\eta] > 1$ dl/g;
(b) $\%(r) - \%(m) > 0$, wherein $\%(r)$ is the % of syndiotactic diads and $\%(m)$ is the % of isotactic diads;
(c) less than 2% of the $CH_2$ groups contained in sequences $(CH_2)_n$, with $n \geq 2$;
(d) Bernoullianity index $(B) = 1 \pm 0.2$.

These propylene polymers, which are in addition endowed with a narrow molecular weight distribution, can be obtained directly from the polymerization reaction of propylene as sole product and, therefore, do not require to be separated.

5 Claims, No Drawings

ATACTIC POLYPROPYLENE

This is a divisional of U.S. application Ser. No. 08/456,291, filed May 31, 1995, now abandoned, which is a continuation of U.S. application Ser. No. 08/175,134, filed Dec. 29, 1993, now abandoned.

The present invention relates to an amorphous polymer of propylene having substantially atactic structure and high molecular weight, and to the process for its preparation.

BACKGROUND OF THE INVENTION

As well known, products of the propylene homopolymerization can be either crystalline or amorphous. Whereas the polypropylene having isotactic or syndiotactic structure is crystalline, the polypropylene having essentially atactic structure appears to be amorphous. The atactic polypropylene, in the representation by the Fischer formula as described in "M. Farina, Topics Stereochem., 17, (1987), 1–111", shows methyl groups casually arranged from one or from the other side of the polymeric chain. As described in the above mentioned publication, useful information on the structure can be obtained from the NMR analysis.

The amorphous polypropylene available on the market is mainly used in adhesive compositions and as additive in bitumens. Generally, it is a by-product of the isotactic polypropylene obtained in the presence of catalysts of the Ziegler-Natta type. However, the separation of the small fractions of amorphous polypropylene from the remainder product involves inconvenient separation processes with solvents.

By operating with catalysts of the metallocene type, polypropylenes having high crystallinity degrees are generally obtained. However, some metallocene catalytic systems are able to polymerize the propylene to amorphous polypropylene. A drawback of these polymers is that thay are endowed with low molecular weights.

U.S. Pat. No. 4,542,199 describes a catalytic system for the polymerization of olefins comprising a bis(cyclopentadienyl)zirconium compound and an alumoxane. From the polymerization reaction of propylene carried out in the presence of this catalyst, low molecular weight atactic polypropylene is obtained.

European patent application No. 283,739 describes a catalytic system for the polymerization of olefins comprising a partially substituted bis(cyclopentadienyl)zirconium compound and an alumoxane. From the polymerization reaction of propylene carried out in the presence of this catalyst, low molecular weight atactic polypropylene is obtained.

U.S. Pat. No. 4,931,417 describes catalysts for the polymerization of olefins comprising a metallocene compound wherein two cyclopentadienyl rings are joined through a radical containing a silicon or germanium atom. The polymerization reaction of propylene carried out in the presence of these compounds partially substituted on the cyclopentadienyl rings gives raise to isotactic polypropylene, whereas with dimethylsilanediylbis(cyclopentadienyl)zirconium dichloride low molecular wight atactic polypropylene is obtained.

Finally, in European patent application No. 399,347 it is described a process for the polymerization of propylene in the presence of a catalyst comprising a bridged metallocene having a cyclopentadienyl ring and a fluorenyl ring, such as isopropyliden(9-fluorenyl)(3-methylcyclopentadienyl)zirconium dichloride. An amorphous polypropylene is obtained, the structure of which is however not atactic, but is defined as syndioisoblocks. Namely, it is a structure wherein syndiotactic and isotactic sequences alternate.

SUMMARY OF THE INVENTION

Hence, it would be very useful to obtain an amorphous polypropylene having high molecular weight, which can be directly obtained by the polymerization reaction of propylene as the only product, thus avoiding expensive separation processes from other polypropylene components present in the product of the polymerization reaction.

It is therefore an object of the present invention to provide an amorphous propylene polymer, which can be obtained directly from the polymerization reaction of propylene, having the following characteristics:

(a) intrinsic viscosity $[\eta]>1$ dL/g;

(b) %(r)–%(m)>0, wherein %(r) is the % of syndiotactic diads and %(m) is the % of isotactic diads;

(c) less than 2% of the $CH_2$ groups contained in sequences $(CH_2)_n$, with $n \geq 2$;

(d) Bernoullianity index (B)=1±0.2.

Another object of the present invention is a propylene amorphous polymer, having the following characteristics:

(a) $[\eta]>1$ dL/g;

(b) %(r)–%(m)>0;

(c) less than 2% of the $CH_2$ groups contained in sequences $(CH_2)_n$, with $n \geq 2$;

(d) B=1±0.2;

(e) $M_w/M_n<5$.

Still another object of the present invention is a process for the preparation of the above said polymers of propylene.

DETAILED DESCRIPTION OF THE INVENTION

Propylene polymers according to the present invention are essentially free of crystallinity. The melting enthalpy values are generally lower than 20 J/G and, preferably, lower than 10 J/G. In most cases, the polymers of the invention have melting entalpy values of 0 J/G.

Preferably, the polymers of the invention have intrinsic viscosity values higher than 1.5 dL/g and, more preferably, higher than 2 dL/g.

Analysis $^{13}$C-NMR carried out on the polypropylene of the invention give information on the tacticity of the polymeric chains, that is on the distribution of the configurations of the tertiary carbon atoms.

The structure of the polymers of the invention is substantially atactic. Nevertheless, it is observed that the syndiotactic diads (r) appear to be more numerous than the isotactic diads (m). Namely, %(r)–%(m)>0 and, preferably, %(r)–%(m)>5.

The Bernoullianity index (B), defined as:

$$B=4[mm][rr]/[mr]^2$$

has values near to the unit, generally comprised in the range 0.8–1.2, preferably comprised in the range 0.9–1.1.

The structure of the polypropylene according to the invention appears to be very regioregular. In fact, from the $^{13}$C-NMR, signals relating to sequences $(CH_2)_a$ wherein $n \geq 2$ are not detectable. Generally, less than 2% and, preferably, less than 1% of the $CH_2$ groups are contained in sequences $(CH_2)_n$ wherein $n \geq 2$.

The polypropylene of the invention is soluble in commonly used solvents, such as chloroform, heptane, diethylether, toluene.

Propylene polymers according to the present invention are endowed with interesting elastomeric properties.

Molecular weights of the polymers of the invention, besides to be high, are distributed within enough restricted ranges. An index of the molecular weight distribution is represented by the ratio $M_w/M_n$. Preferably, the polymers of the invention have values of $M_w/M_n<4$; more preferably, $M_w/M_n<3$.

Propylene polymers according to the present invention can be prepared by a process, which is a further object of the present invention, and which comprises the polymerization reaction of propylene in the presence of a catalyst comprising the product of the reaction between:

(A) a compound of formula (I)

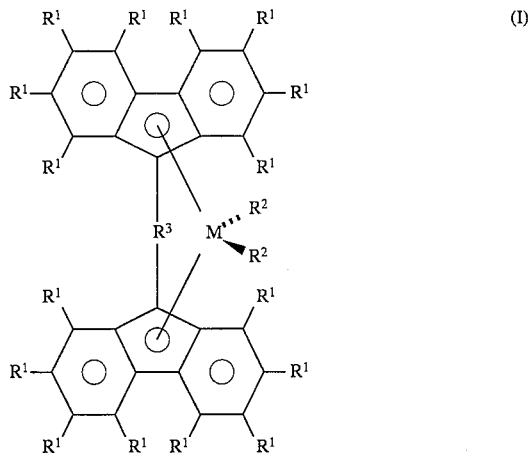

wherein substituents $R^1$, the same or different from each other, are hydrogen atoms, $C_1$-$C_{20}$ alkyl radicals, $C_3$-$C_{20}$ cycloalkyl radicals, $C_2$-$C_{20}$ alkenyl radicals, $C_6$-$C_{20}$ aryl radicals, $C_7$-$C_{20}$ alkylaryl radicals, or $C_7$-$C_{20}$ arylalkyl radicals, optionally two adjacent substituents $R^1$ can form a cycle comprising from 5 to 8 carbon atoms and, furthermore, substituents $R^1$ can contain Si or Ge atoms;

M is Ti, Zr or Hf;

substituents $R^2$, the same or different from each other, are halogen atoms, —OH, —SH, $R^1$, —$OR^1$, —$SR^1$, —$NR^1_2$ or $PR^1_2$, wherein $R^1$ is defined as above; the group $R^3$ is selected from $>CR^1_2$, $>SiR^1_2$, $>GeR^1_2$, $>NR^1$ or $>PR^1$, wherein $R^1$ is defined as above and optionally, when $R^3$ is $>CR^1_2$, $>SiR^1_2$ or $>GeR^1_2$, both substituents $R^1$ can form a cycle comprising from 3 to 8 atoms;

optionally as reaction product with an aluminium organo-metallic compound of formula $AlR^3$ or $Al_2R^4_6$, wherein substituents $R^4$, the same of different from each other, are $R^1$ or halogen, and (B) an alumoxane, optionally mixed with an aluminum organo-metallic compound of formula $AlR^3$ or $Al_2R^4_3$, wherein substituents $R^4$, the same or different from each other, are defined as above, or one or more compounds able to give a metallocene alkyl cation.

The alumoxane used as component (B) can be obtained by reaction between water and an aluminium organo-metallic compound of formula $AlR^4_3$ or $Al_2R^4_6$, wherein substituents $R^4$, the same or different from each other, are defined as above, with the proviso that at least one $R^4$ is different from halogen. In that case, these are reacted in molar rations Al/water comprised between about 1:1 and 100:1.

The molar ratio between the aluminium and the metal of the metallocene compound is comprised between about 10:1 and about 5000:1, and preferably between about 100:1 and 4000:1.

Particularly Suitable metallocene compounds of formula (I) are those wherein M=Zr, substituents $R^1$ are hydrogen atoms, substituents $R^1$ are chlorine or methyl groups, and the group $R^3$ is a radical $>Si(CH_3)_2$, such as, for example, dimethylsilandiylbis(fluorenyl)zirconium dichloride.

The alumoxane used in the catalyst according to the invention is a linear, branched or cyclic compound, containing at least one group of the type:

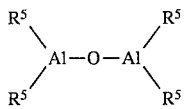

wherein substituents $R^5$, the same or different from each other, are $R^1$ or a group —$O$—$Al(R^5)_2$, and optionally some $R^5$ can be halogen or hydrogen atoms.

In particular, it is possible to use alumoxanes of formula:

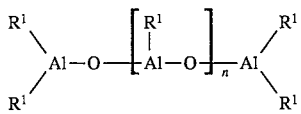

in the case of linear compounds, wherein n is 0 or an integer comprised between 1 and 40, or alumoxanes of formula:

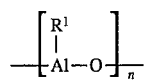

in the case of cyclic compounds, with n which is an integer comprised between 2 and 40.

Radicals $R^1$ are preferably methyl, ethyl or isobutyl. Examples of alumoxanes suitable for the use according to the present invention are methylalumoxane (MAO) and isobutylalumoxane (TIBAO).

Non limitative examples of aluminium compounds of formula $AlR^4_3$ or $Al_2R^4_6$ are:

| | | | |
|---|---|---|---|
| Al(Me)₃, | Al(Et)₃, | AlH(Et)₂, | Al(iBu)₃, |
| AlH(iBu)₂, | Al(iHex)₃, | Al(C₆H₅)₃, | Al(CH₂C₆H₅)₃, |
| Al(CH₂-CMe₃)₃, | Al(CH₂SiMe3)₃, | Al(Me)₂iBu, | Al(Me)₂Et, |
| AlMe(Et)₂, | AlMe(iBu)₂, | Al(Me)₂iBu, | Al(Me)₂Cl, |
| Al(Et)₂Cl, | AlEtCl₂, | Al₂(Et)₃Cl₃, | | wherein Me=methyl, Et=ethyl, iBu=isobutyl, iHex=isohexyl.

Among the above mentioned aluminium compounds, trimethyl aluminium and triisobuthyl aluminium are preferred.

Non limitative examples of compounds able to form a metallocene alkyl cation are compounds of formula $Y^+Z^-$, wherein $Y^+$ is a Bronsted acid, able to give a proton and to react irreversibly with a substituent $R^2$ of the metallocene of formula (I), and $Z^-$ is a compatible anion, which does not coordinate, which is able to stabilize the active catalytic species which originates from the reaction of the two compounds and which is sufficiently labile to be able to be removed from an olefinic substrate. Preferably, the anion $Z^-$ comprises one or more boron atoms. More preferably, the anion $Z^-$ is an anion of the formula $BAr^-_4$, wherein substituents Ar, the same or different from each other, are aryl radicals such as phenyl, pentafluorophenyl, bis(trifluoromethyl)phenyl. Particularly preferred is the tetrakis-pentafluorophenyl borate. Furthermore, compounds of formula $BAr_3$ can be suitably used.

The catalysts used in the process of the present invention can be also used on inert supports. This is obtained by depositing the metallocene (A), or the product of the reaction of the same with the component (B), or the component (B) and thereafter the metallocene (A), on inert supports such as for example silica, alumina, styrene-divinylbenzene copolymers or polyethylene.

The solid compound thus obtained, combined with a further addition of alkylaluminium compound either as such or prereacted with water, if necessary, is usefully used in the gas phase polymerization.

The propylene polymerization process in the presence of the catalysts above described can be carried out either in liquid phase, in the presence or not of an inert aliphatic or aromatic hydrocarbon solvent, such as hexane or toluene, or in gas phase.

The polymerization temperature is generally comprised between 0° C. and 250° C., in particular between 20° C. and 150° C., and more particularly between 40° C. and 90° C.

The molecular weight of polymers can be varied merely by changing the polymerization temperature, the type or the concentration of the catalytic components or by using molecular weight regulators such as, for example, hydrogen.

The molecular weight distribution can be varied by using mixtures of different metallocene compounds, or by carrying out the polymerization in several steps which differ as to the polymerization temperature and/or the concentrations of the molecular weight regulator.

Polymerization yields depend on the purity of the metallocene component of the catalyst. Therefore, the metallocene compounds can be used as such or subjected to purification treatments.

The components of the catalyst can be contacted among them before the polymerization. The contact time is generally comprised between 1 and 60 minutes, preferably between 5 and 20 minutes.

The following examples are given to illustrate and not to limit the invention.

EXAMPLES

Characterizations

The intrinsic viscosity [η] was measured in tetrahydronaphtalene at 135° C.

The molecular weight distribution was determined by GPC analysis carried out by an apparatus WATERS 150 in orthodichlorobenzene at 135° C.

The Differential Scanning Calorimetry (DSC) measurements were carried out on an apparatus DSC-7 of Perkin-Elmer Co. Ltd. according to the following procedure. About 10 mg of sample were heated at 200° C. with a scanning speed equal to 20° C./minute; the sample was kept at 200° C. for 5 minutes and thereafter was cooled with a scanning speed equal to 20° C./minute. Thereafter a second scanning equal to 20° C./min was carried out according to the same modalities of the first one. The values reported are those obtained in the second scanning.

The $^{13}$C-NMR analysis of the polymers were carried out by a Bruker AC200 instrument at 50,323 MHz, using $C_2D_2Cl_4$ as solvent (about 300 mg of polymer dissolved in 2.5 ml of solvent), at 120° C.

The data relative to the physical-mechanical properties have been determined according to the methods indicated below.

| | |
|---|---|
| - Tension set | ASTM - D 412 |
| - Tensile modulus | ASTM - D 4065 |
| - Tensile strenght at yield | DIN - 53455-S3A |
| - Elongation at yield | DIN - 53455-S3A |
| - Tensile strenght at break | DIN - 53455-S3A |
| - Elongation at break | DIN - 53455-S3A |
| - Hardness Shore A | ASTM - D 2240 |
| - Haze | ASTM - D 1003 |

Example 1—Synthesis of the Catalysts (A) Synthesis of dimethylbis(9-fluorenyl)silane—$(CH_3)_2Si(Flu)_2$ To a solution obtained by dissolving 50 g (300 mmol) of fluorene in 350 ml of tetrahydrofuran (THF), kept under stirring at the temperature of 0° C., 120 ml of a 2.5M hexane solution of n-butyllithium were added dropwise, whili maintaining the temperature at 0° C. After the addition was complete, the solution was warmed to room temperature and stirring was continued for 5 hours after gas evolution had ceased.

The resulting solution was then added dropwise to a stirring solution obtained by dissolving 19.4 g (0.15 mol) of dimethyldichlorosilane in 100 ml of THF, maintained at 0° C. during the addition. After the addition was complete, the solution was warmed to room temperature and stirring was continued for 14 hours.

The reaction was quenched with water and the organic phase collected and dried over $MgSO_4$. Solvents were removed in vacuo and the solids collected were recrystallized from hexane, yielding 37 g (63%) of dimethylbis(9-fluorenyl)silane.

(B) Synthesis of dimethylsilanediylbis(9-fluorenyl) zirconium dichloride—$Me_2SiFlu_2ZrCl_2$ To a solution prepared by dissolving 8.5 g (21.9 mmol) of $(CH_3)_2Si(Flu)_2$ obtained under (A) in 150 ml of diethylether $(Et_2O)$, kept under rapid stirring at the temperature of 0° C., 32.5 ml of a 1.4M solution of methyllithium in $Et_2O$ were added. After the addition was complete, the mixture was warmed to room temperature and stirring was continued for 5 hours after gas evolution had ceased. The resulting suspension was cooled to −78° C. and then added to a rapidly stirring slurry of 5.1 g of $ZrCl_4$ (21.9 mmol) in 150 ml of pentan, also kept at −78° C. After the addition was complete, the reaction mixture was slowly warmed to room temperature and stirring was continued for 17 hours. Solvents were then removed by filtration and the solids collected were washed with $Et_2O$ and then pentane. The bright red complex was dried to free-flowing powder under vacuum at room temperature, yielding 13.1 g of $Me_2SiFlu_2ZrCl_2$.

(C) Methylalumoxane (MAO)

A commercial (Witco, MW 1400) 30% toluene solution of MAO was dried in vacuo until a solid, glassy material was obtained which was finely crushed and further treated in vacuo until all volatiles were removed (4–6 hours, 0.1 mmHg, 40–50° C.) to leave a white, free-flowing powder.

Example 2—Polymerization of Propylene

Into a 1 liter glass Büchi autoclave, provided with jacket, screw stirrer and thermoresistance, and joined to a thermostat for controlling the temperature, degassed with an hexane solution of AliBu$_3$ and dried in vacuum under nitrogen stream, 0.4 liter of n-hexane (purified by passing it on alumina columns) were fed and the temperature was brought to 50° C.

The catalyst solution was prepared as follows: 15.8 mg of the metallocene prepared in Example 1(B) and 229.3 mg of MAO were dissolved in 10 ml of toluene. 3.8 ml of this solution were transferred in 20 ml of toluene containing 1.043 mg of MAO and this solution was injected into the autoclave under propylene stream. The autoclave was pressurized at 4 bar-a with propylene and the polymerization was carried out for 90 minutes.

After coagulation in methanol and drying, 49 g of solid and transparent polypropylene, having intrinsic viscosity 1.41 dL/g, were separated. The GPC analysis gave the following values: $M_w$=200,000; $M_w/m_n$=3.5. The $^{13}$C-NMR analysis of signal of methyl groups gave the following triads composition: %mm=16.9; %mr=48.5, %rr=34.6; %r–%m=17.7; B=0.99. Signals relating to sequences $(CH_2)_n$, wherein $n \geq 2$ were not detected. The Differential Scanning Calorimetry (DSC) measurements did not show any detectable peak attributable to the melting enthalpy ($\Delta H_f$). The data of the physical-mechanical characterizations are reported in Table 1.

Example 3—Polymerization of Propylene 480 g of propylene were charged into a 1.4-L jacketed stainless-steel autoclave, equipped with magnetically driven stirrer, 35-mL stainless-steel vial and thermoresistance, connected to a thermostat for temperature control, previously dried at 70° C. in a stream of propylene. The autoclave was then thermostatted at 40° C.

11.5 mL of a toluene solution containing 1.5 mg of Me2SiFlu$_2$ZrCl$_2$ prepared as described in example 1(B) and 326 mg of MAO from Example 1(C) were stirred 5 min at room temperature and then injected in the autoclave by means of propylene pressure through the stainless-steel vial, the temperature rapidly raised to 50° C. and the polymerization carried out at constant temperature for 1 hour.

21 g of solid, transparent, amorphous polypropylene were obtained. This product has an intrinsic viscosity of 2.28 dL/g and is completely soluble in warm CHCl$_3$. The GPC analysis gave the following values: $M_w$=377,000 and $M_w/M_n$=2.64. The $^{13}$C-NMR analysis of the methyl signals gave the following triad composition: %mm=19.4; %mr=48.6; %rr=32.0; %r–%m=12.6; B=1.05. Signals relating to sequences (CH$_2$)n, wherein $n \geq 2$ were not detected. The Differential Scanning Calorimetry (DSC) measurements did not show any detectable peak attributable to the melting enthalpy ($\Delta H_f$).

What is claimed is:

1. A process for the preparation of an amorphous polypropylene, comprising the polymerization reaction of propylene in the presence of a catalyst comprising the product of the reaction between:

(A) a compound of formula (I)

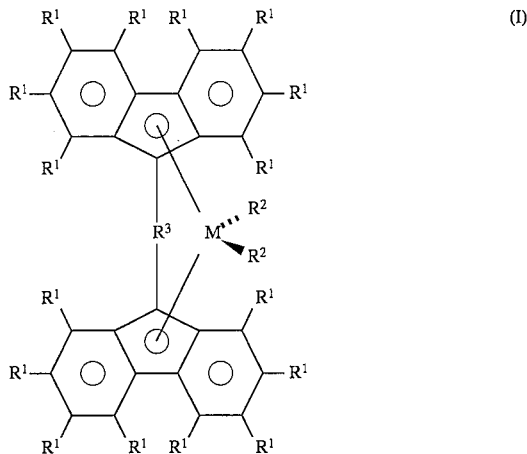

wherein substituents R$^1$, the same or different from each other, are hydrogen atoms, C$_1$–C$_{20}$ alkyl radicals, C$_3$–C$_{20}$ cycloalkyl radicals, C$_2$–C$_{20}$ alkenyl radicals, C$_6$–C$_{20}$ aryl radicals, C$_7$–C$_{20}$ alkylaryl radicals, or C$_7$–C$_{20}$ arylalkyl radicals, optionally two adjacent substituents R$^1$ can form a cycle comprising from 5 to 8 carbon atoms and, furthermore, substituents R$^1$ can contain Si or Ge atoms;

M is Ti, Zr or Hf;

substituents R$^2$, the same or different from each other, are halogen atoms, —OH, —SH, R$^1$, —OR$^1$, —SR$^1$, —NR$_2^1$ or —PR$_2^1$, wherein R$^1$ is defined as above;

the group R$^3$ is selected from >CR$_2^1$, >SiR$_2^1$, >GeR$_2^1$, >NR$^1$ or >PR$^1$, wherein R$^1$ is defined as above and optionally, when R$^3$ is >CR$_2^1$, >SiR$_2^1$ or >GeR$_2^1$, both substituents R$^1$ can form a cycle comprising from 3 to 8 atoms;

(B) an alumoxane, or one or more compounds able to give a metallocene alkyl cation.

2. The process according to claim 1, wherein the compound of formula (I) is pre-reacted with an aluminium organo-metallic compound of formula AlR$^4_3$ or Al$_2$R$^4_6$, wherein substituents R$^4$, the same of different from each other, are R$^1$ or halogen.

3. The process according to claim 1, wherein the compound able to form a metallocene alkyl cation is a compound of formula Y$^+$Z$^-$, wherein Y$^+$ is a Bronsted acid, able to give a proton and to react irreversibly with a substituent R$^2$ of the metallocene of formula (I) and Z$^-$ is a compatible anion, which does not coordinate, which is able to stabilize the active catalytic species originating from the reaction of the two compounds, and which is sufficiently labile to be able to be removed from an olefinic substrate.

TABLE 1

| Example | Tension set 50% | Tension set 100% | Tensile modulus (MPa) | Tensile strength at yield (MPa) | Elongation at yield (%) | Tensile strenght at break (MPa) | Elongation at break (%) | Hardness (°Shore) A | Haze (%) |
| --- | --- | --- | --- | --- | --- | --- | --- | --- | --- |
| 2 | 20 | 44 | 7.8 | 0.89 | 160 | >0.6 | >1000 | 50 | 69.6 |

4. The process according to claim 3, wherein the anion $Y^+$ comprises one or more boron atoms.

5. The process according to claim 1, wherein the catalyst comprises the product of the reaction between dimethylsilandiylbis(fluorenyl)zirconium dichloride and a compound selected from methylalumoxane and isobutylalumoxane.

* * * * *